(12) United States Patent
Tarkiainen et al.

(10) Patent No.: US 8,345,662 B2
(45) Date of Patent: Jan. 1, 2013

(54) METHOD, MOBILE TERMINAL, SYSTEM AND COMPUTER PROGRAM PRODUCT FOR REAL TIME CONTENT ATTRIBUTING

(75) Inventors: Mikko Tarkiainen, Espoo (FI); Jan Blom, Espoo (FI); Petri Piippo, Lempäälä (FI); Jyri Virtanen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 964 days.

(21) Appl. No.: 11/364,214

(22) Filed: Feb. 28, 2006

(65) Prior Publication Data
US 2007/0201378 A1    Aug. 30, 2007

(51) Int. Cl.
*H04L 12/28* (2006.01)
(52) U.S. Cl. .................................................. 370/351
(58) Field of Classification Search .................. 370/351, 370/389, 395.1, 395.4, 395.42, 444, 443, 370/442, 441, 431; 455/403, 422.1, 435.1, 455/435.2, 435.3
See application file for complete search history.

(56) References Cited

U.S. PATENT DOCUMENTS

| | | | |
|---|---|---|---|
| 6,947,738 B2 * | 9/2005 | Skog et al. | 455/426.1 |
| 2002/0101865 A1 * | 8/2002 | Takagi et al. | 370/360 |
| 2003/0067877 A1 * | 4/2003 | Sivakumar et al. | 370/232 |
| 2004/0081295 A1 | 4/2004 | Brown et al. | |
| 2004/0223505 A1 * | 11/2004 | Kim et al. | 370/412 |
| 2005/0117527 A1 * | 6/2005 | Williams et al. | 370/260 |
| 2005/0286473 A1 * | 12/2005 | Stubbs | 370/331 |
| 2006/0023697 A1 * | 2/2006 | Shore et al. | 370/352 |
| 2007/0201378 A1 * | 8/2007 | Tarkiainen et al. | 370/252 |

OTHER PUBLICATIONS

The European Search Report for EP Application No. 07705640.6, filed Feb. 22, 2007; Date of Mailing Nov. 10, 2009.

* cited by examiner

*Primary Examiner* — Fan Ng
(74) *Attorney, Agent, or Firm* — Squire Sanders (US) LLP

(57) ABSTRACT

A method of providing content attributing during an ongoing conversation includes receiving an assignment of an attribute to a selected portion of content from the ongoing conversation, and asynchronously delivering the selected portion to selected recipients based on the attribute.

34 Claims, 5 Drawing Sheets

METHOD, MOBILE TERMINAL, SYSTEM AND COMPUTER PROGRAM PRODUCT FOR REAL TIME CONTENT ATTRIBUTING

FIELD OF THE INVENTION

Embodiments of the present invention relate generally to mobile terminal technology and, more particularly, relate to a method, mobile terminal, system and computer program product for providing real time content attributing.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Concurrent with the technological expansion of networking technologies has been a consumer demand for improved wireless network based services. For example, web browsing and other web based services, short message services, email and many services capable of deployment at a mobile terminal are continuously being developed. One area in which there is a demand to provide improved mobile terminal service relates to internet protocol (IP) based real time conversations. Many means for providing mobile terminal users with an ability to conduct real time conversations are currently in existence, such as instant messaging (IM) and instant relay chat (IRC).

It is becoming more common for text-based chat to be used among particular groups of people as a means for discussion of topics, organization of events or meetings, etc. IM is an example of a text-based chat mechanism that is not generally recognized as an effective group level communication tool. Although groups may communicate via IM, such communication is generally performed via a series of person-to-person instant messages. Accordingly, for example, in order for an entire group to be informed of an event, multiple instant messages must be sent among the group members. IRC is generally considered to be more conducive to group communications. In IRC, a user logs on to a channel to communicate with other channel members in an IP-based real time environment. However, particularly in the context of group based conversations where not all members of the group are currently monitoring the channel, a problem is created in that those not monitoring the channel will miss details of the discussion. Thus, for example, if a decision is made by the group to meet at a particular location, members not currently monitoring the channel will have to be contacted by separate means. In other words, IRC and other current group based communication mechanisms that are capable of serving mobile terminal users do not support asynchronous communication. Thus, for example, a series of instant messages or other communications that are manually initiated may be necessary to inform all group members of important group related information.

In light of the problems discussed above, there is a need to provide an IP-based communication mechanism that reduces the burden on users of mobile terminals to deliver notification of events, decisions, questions, etc. to members of a group that are not currently monitoring the group's communication channel.

BRIEF SUMMARY OF THE INVENTION

A method, mobile terminal, system and computer program product are therefore provided that enable a user of a mobile terminal to assign an attribute to content that arises during a real time conversation on a communication channel. Then, based on the attribute, the content may be distributed to group members, or at least those group members who are not actively monitoring the channel at the time the content is created. Furthermore, either the attribute or an indication of the importance of the content may determine a means by which the group members receive the content. Thus, for example, a messaging system is provided which gives mobile terminal users an ability to asynchronously share content that is received during a real time communication session with group members who are not monitoring the real time communication session.

In one exemplary embodiment, a method of providing real time content attributing during an ongoing conversation is provided. The method includes receiving an assignment of an attribute to a selected portion of content from the ongoing conversation, and asynchronously delivering the selected portion to selected recipients based on the attribute.

In another exemplary embodiment, a computer program product for providing real time content attributing during an ongoing conversation is provided. The computer program product includes at least one computer-readable storage medium having computer-readable program code portions stored therein. The computer-readable program code portions include a first and second executable portions. The first executable portion is for receiving an assignment of an attribute to a selected portion of content from the ongoing conversation. The second executable portion is for asynchronously delivering the selected portion to selected recipients based on the attribute.

In another exemplary embodiment, a mobile terminal for providing real time content attributing is provided. The mobile terminal includes an attributing element and an asynchronous communication element. The attributing element is configured to receive an assignment of an attribute to a selected portion of content from the ongoing conversation. The asynchronous communication element is in communication with the attributing element. The asynchronous communication element is configured to asynchronously deliver the selected portion to selected recipients based on the attribute.

In another exemplary embodiment, a system for providing real time content attributing is provided. The system includes a mobile terminal and a client device in communication via a communication portal. The mobile terminal includes an attributing element and an asynchronous communication element. The attributing element is configured to receive an assignment of an attribute to a selected portion of content from the ongoing conversation. The asynchronous communication element is in communication with the attributing element. The asynchronous communication element is configured to asynchronously deliver the selected portion to selected recipients based on the attribute.

In another exemplary embodiment, a mobile terminal for providing real time content attributing is provided. The mobile terminal includes an attributing means and an asynchronous communication means. The attributing means is for receiving an assignment of an attribute to a selected portion of content from the ongoing conversation. The asynchronous communication means is in communication with the attributing means. The asynchronous communication means is for asynchronously delivering the selected portion to selected recipients based on the attribute.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
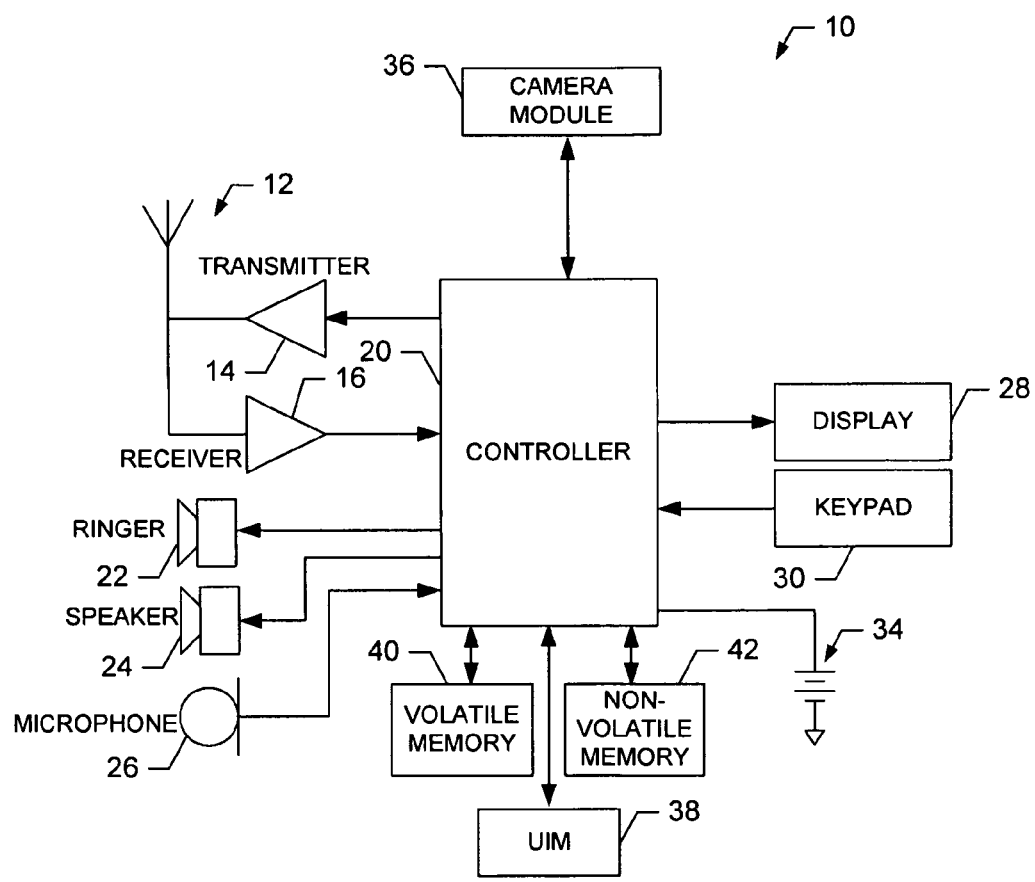
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-36 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
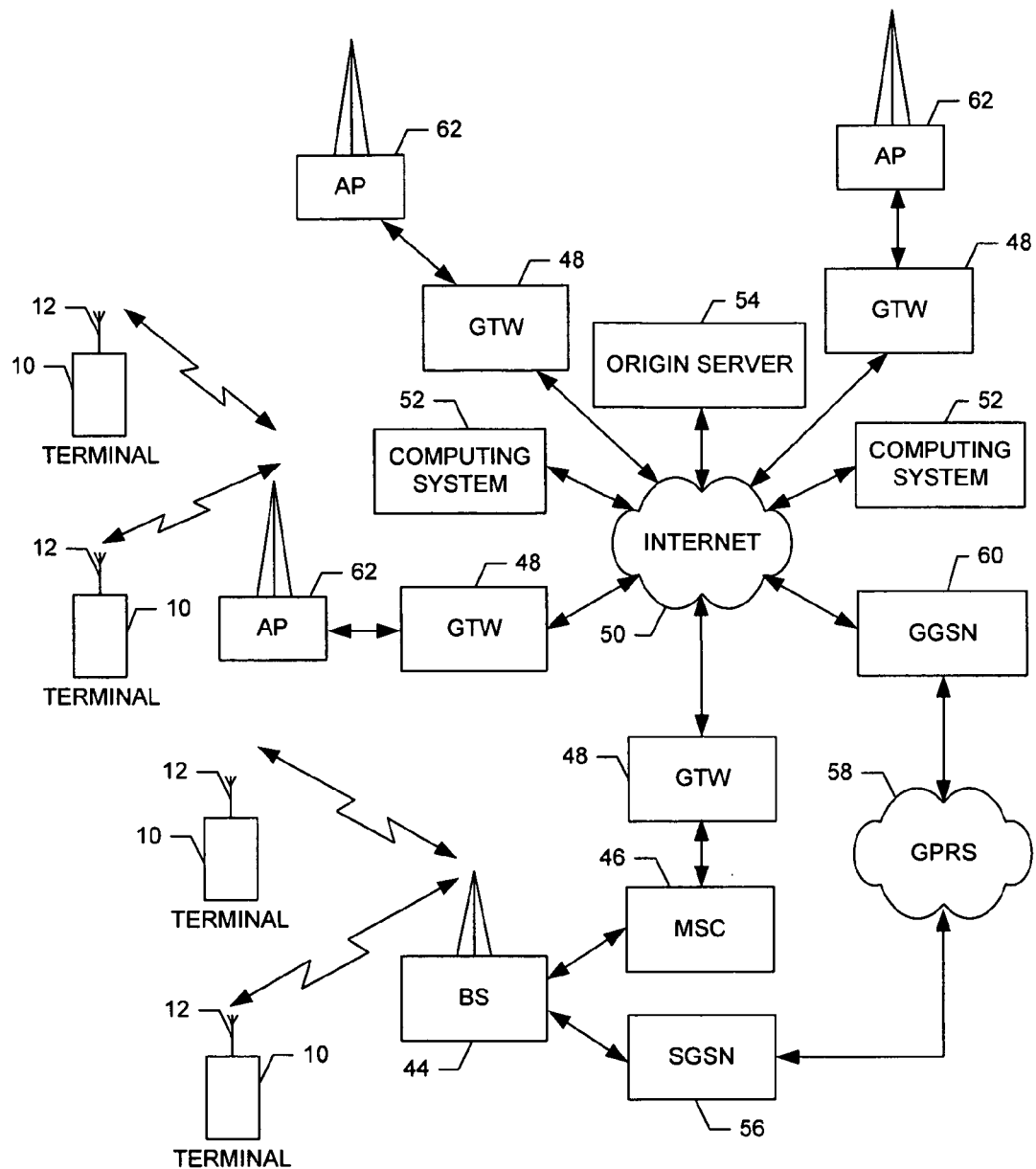
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as multimedia messaging service (MMS) messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the present invention will now be described with reference to FIG. 3, in which certain elements of a system for providing real time content attributing at a mobile terminal are displayed. The system of FIG. 3 may be employed, for example, using at least one of the mobile terminals 10 of FIG. 2 and also possibly using the computing system 52 or the origin server 54 of FIG. 2. However, it should be noted that the system of FIG. 3, may also be employed on a variety of other devices, both mobile and fixed, and therefore, the present invention should not be limited to application on devices such as the mobile terminal 10 of FIGS. 1 and 2. It should also be noted, however, that while FIG. 3 illustrates one example of a configuration of a system for providing real time content attributing, numerous other configurations may also be used to implement embodiments of the present invention.

Figure 3:
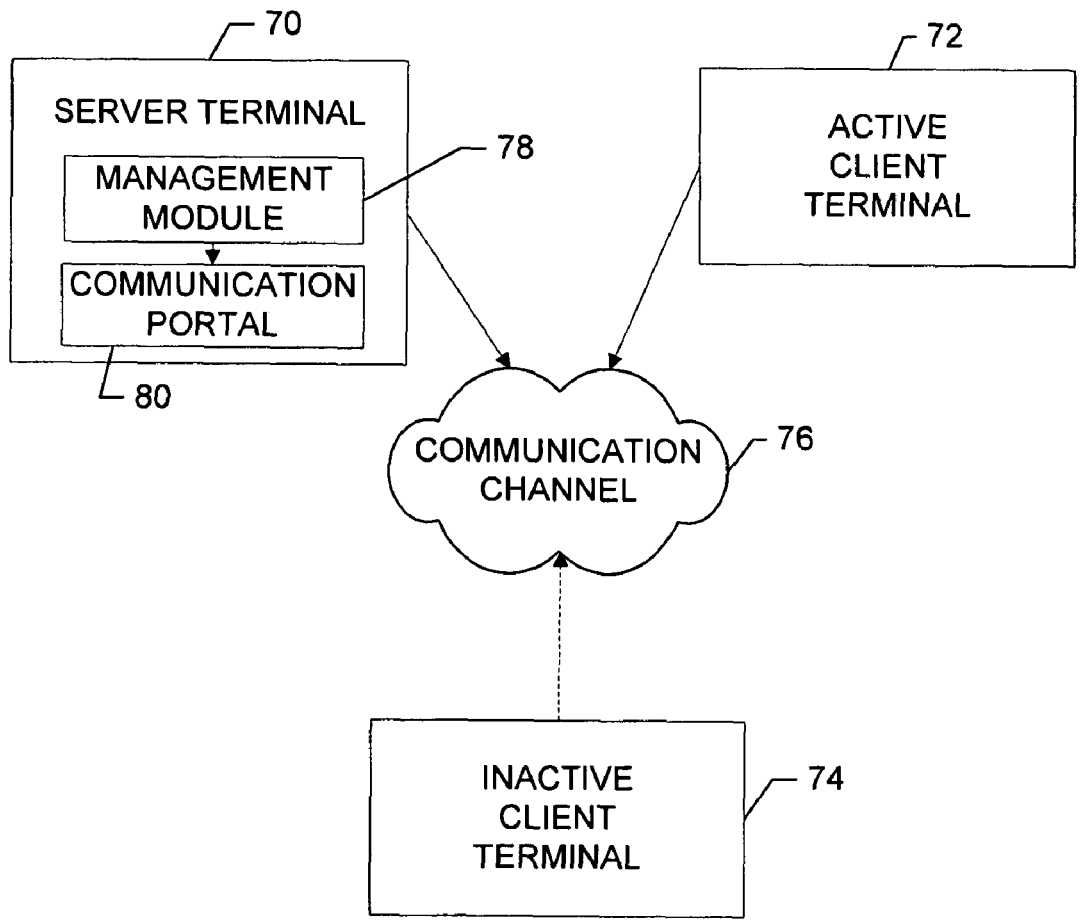
FIG. 3 illustrates a block diagram of a system for providing real time content attributing at a mobile terminal according to an exemplary embodiment of the present invention.

Referring now to FIG. 3, a system for providing real time content attributing at a mobile terminal is provided. The system includes a server terminal 70, an active client terminal 72, and an inactive client terminal 74. It is assumed that the active client terminal 72 is in communication with the server terminal 70 via a communication channel 76. The inactive client terminal 74 is capable of communication with the server terminal and the active client terminal 72 via the communication channel 76, but it is assumed that the inactive terminal 74 is not currently monitoring the communication channel 76. It should be noted that although FIG. 3 only shows one active client terminal and one inactive client terminal, the server terminal 70 is capable of communication with multiple active and inactive client terminals. It should be understood that the server terminal 70, the active client terminal 72, and the inactive client terminal 74 may each be embodied as a mobile phone described above in reference to FIG. 1. Alternatively, the server terminal 70, the active client terminal 72, and the inactive client terminal 74 may each be any one of the exemplary mobile terminals mentioned above, such as portable digital assistants (PDAs), pagers, mobile televisions, laptop computers and other types of voice and text communications systems, or even a fixed terminal such as a personal computer. The server terminal 70 could also be a client server capable of communication with a plurality of clients.

The communication channel 76 may be embodied in, for example, any of the wireline or wireless communication techniques described above. In an exemplary embodiment, the communication channel 76 is an IP-based wireless communication channel capable of allowing a plurality of mobile terminals belonging to a group to monitor text communications between any members of the group.

In an exemplary embodiment, the server terminal 70 includes a management module 78. The management module 78 may be any means or device embodied in hardware, software or a combination of hardware and software that is capable of executing scripts or other instructions for setting up and managing a communication portal 80 which is hosted at the server terminal 70. The communication portal 80 provides the means by which multiple group members may communicate with each other. In other words, the communication portal 80 may be a chat forum for mobile terminal users. The scripts or other instructions that create the functionality of the communication portal 80 may be stored on a memory of or otherwise accessible by the server terminal 70 and executed by a processing element of the server terminal 70. Furthermore, the management module 78 may include a management file, which is stored in a memory of the server terminal 70. The management file may include instructions for execution to create and manage the communication portal 80.

In an exemplary embodiment, the management file and any other scripts necessary to create and manage the communication portal 80 may be downloaded wirelessly or otherwise onto the server terminal 70. Alternatively, the management file and any other scripts necessary to create and manage the communication portal 80 may be pre-installed on the server terminal 70. Accordingly, in a particular communication system each client terminal may also possess a capability to act as a server terminal for a particular group of members, however, only one group member will act as the server terminal 70 at any one time. Thus, the server terminal 70 is not defined merely as a device having the capability of acting as the server terminal, but rather the server terminal 70 is defined as a device performing the functions of the server terminal. In other words, the server terminal 70 is defined as the terminal that has set up the communication portal 80 and is responsible for managing the communication portal 80. It should also be noted that the server terminal 70 may simultaneously manage a plurality of communication portals in which each communication portal corresponds to a different group of members or client terminals.

The communication portal 80 may be established by a user of the server terminal 70 (i.e., portal manager) by any suitable means. For example, the server terminal 70 may provide a user interface including a menu from which an option to create the communication portal 80 may be selected by the portal manager. Once the communication portal 80 is created, a web site containing a unique URL is hosted at the server terminal 70. Following creation of the communication portal 80, the portal manager may assign a name to the communication portal 80 and invite potential members to join. An invitation to the potential members may include a link to the unique URL that is hosted at the server terminal 70. The invitation may also include a text portion describing, for example, the name of the communication portal 80, identification of the portal manager or a topic or purpose of the communication portal 80, and any other suitable information. The invitation may be embodied as a message such as, for example, a MMS message, a short message service (SMS) message, etc. Accordingly, for example, the invitation may arrive at a potential member's mobile terminal as an SMS message if the mobile terminal is a cellular phone, or the invitation may arrive at the potential member's personal computer as an email message. The potential member may then link to the unique URL to access the communication portal 80 as the active client terminal 72, thereby becoming an active member of the group. When the active client terminal 72 stops monitoring the communication portal 80, the active client terminal 72 becomes instead the inactive client terminal 74. In the context of the present embodiment, monitoring refers to the act of having an active link to the communication portal 80.

It will be understood that at any given time there may be a plurality of either or both of the active and inactive terminals 72 and 74 while the server terminal 70 is hosting the communication portal 80. It will also be understood that any terminal that is monitoring the communication portal 80 is an active client terminal 72 while any terminal that is on the member list but not monitoring the communication portal 80 is an inactive client terminal 74. Accordingly, once added to the member list, a terminal is an inactive client terminal 74 until such time as the terminal links to the communication portal 80 when the terminal becomes an active client terminal 72. Furthermore, the terminal may undergo any number of state changes between being the active and inactive terminals 72 and 74. Thus, the inactive client terminal 74 could be an invited contact that has not yet linked to the unique URL, or a formerly active client terminal 74.

A respective format of the invitation may be determined at the management module 78. For example, according to one exemplary embodiment, the portal manager may store a contact list, such as a phone book, on the server terminal 70. The contact list may include contact information such as a telephone number, email address, etc. associated with each contact listed in the contact list. Each contact may be a friend, business associate, or other acquaintance that the portal manager may wish to invite to the communication portal 80. Using the management module 78, the portal manager may select some or all of the contacts in the contact list to receive the invitation. Accordingly, the management module 78 sends the selected contacts the invitation in a format of the contact information associated with the contact in the contact list. If multiple contact means are listed for a particular contact, the portal manager may choose one or more of the multiple contact means to invite the contact to join the communication portal 80. The management module 78 may then include a member list which includes contact information for each group member. Group members are defined as those contacts that have received an invitation to join the communication portal 80. Alternatively, group members could be defined only as those contacts that have accepted the invitation, for example, by logging onto the communication portal 80 via the unique URL. Thus, the inactive client terminal 74 could be an invited contact that has not yet linked to the unique URL, or a formerly active client terminal 74. In any case, both the active and inactive client terminals 72 and 74 are group members along with the server terminal 70. The active client terminal 72 is a group member that is currently monitoring the communication portal 80, while the inactive client terminal 74 is a group member that is not currently monitoring the communication portal 80.

In an alternative exemplary embodiment, the portal manager may manually send the invitation to a potential member, for example, via an SMS message or an email. Alternatively, the server terminal 70 may conduct a proximity scan to determine mobile terminals or other communication devices in proximity to the server terminal 70. A list of proximately located devices may then be generated, from which particular devices to send invitations to may be selected. In an exemplary embodiment, a Bluetooth scan may be performed and a list of Bluetooth capable devices that are proximately located may be generated, from which the portal manager may select particular devices to which the invitations are to be sent. Accordingly, a portal manager who wishes to invite potential members but who does not have contact information for the potential members may invite all or selected ones of the potential members in proximity to the portal manager without knowing their contact information.

In an exemplary embodiment, the portal manager may automatically resend invitations to contacts that have previously received invitations, but have not yet linked to the communication portal 80. For example, the management module may enable the portal manager to select invitations to be sent to nonresponsive invitees at a predetermined interval. Alternatively, the portal manager may automatically resend invitations to group members that have not participated in group conversations or linked to the communication portal 80 for a predetermined period of time.

The communication portal 80 may have a plurality of features associated with or accessible through the communication portal 80. In an exemplary embodiment, the communication portal 80 may include features such as a banner, a message board, a real time chat line, and an activity page. The banner feature may enable display of a message to all group members in a prominent location when the communication portal 80 is accessed. The message may include an announcement or any other text communication meant for all group members. In an exemplary embodiment, the banner feature may be accessed and altered only by the portal manager. However, in an alternative embodiment, any group member may access and alter the banner feature by inserting a new message. The message board feature may allow any of the group members to post messages, which remain posted, for example, on a message board page until a predetermined time or until deleted. The message board page may be accessible by all group members to enable all group members to read messages posted thereon. The activity page may include statistics related to activity or participation of the group members. For example, the activity page may include an indication of which of the group members is most active at messaging, posting information on the message board, etc. The activity page could also be used for any other purpose intended to facilitate group cohesion and interest in maintaining the communication portal 80.

The real time chat feature may include a message line or other means by which real time conversations may be conducted. In other words, the real time chat feature may provide a forum for real time chat conversations. The conversations may be viewed by all group members who are currently monitoring the message line of the communication portal 80. The message line may also include a mechanism by which communication threads defined by real time conversation text may be saved to the message board page. For example, the message line may enable conversation threads to be copied and pasted to the message board page. The message line may also include a mechanism by which group members that are not currently monitoring the communication portal 80 may be invited to join in an active conversation. For example, an SMS message or any other suitable notification may be sent to a group member that is not currently monitoring the communication portal 80. Each of the features described above may be accessed via a user interface, for example, of the mobile terminal 10. The features may be accessed via a menu selection, icon selection, or selection of any object associated with the features.

Figure 4:
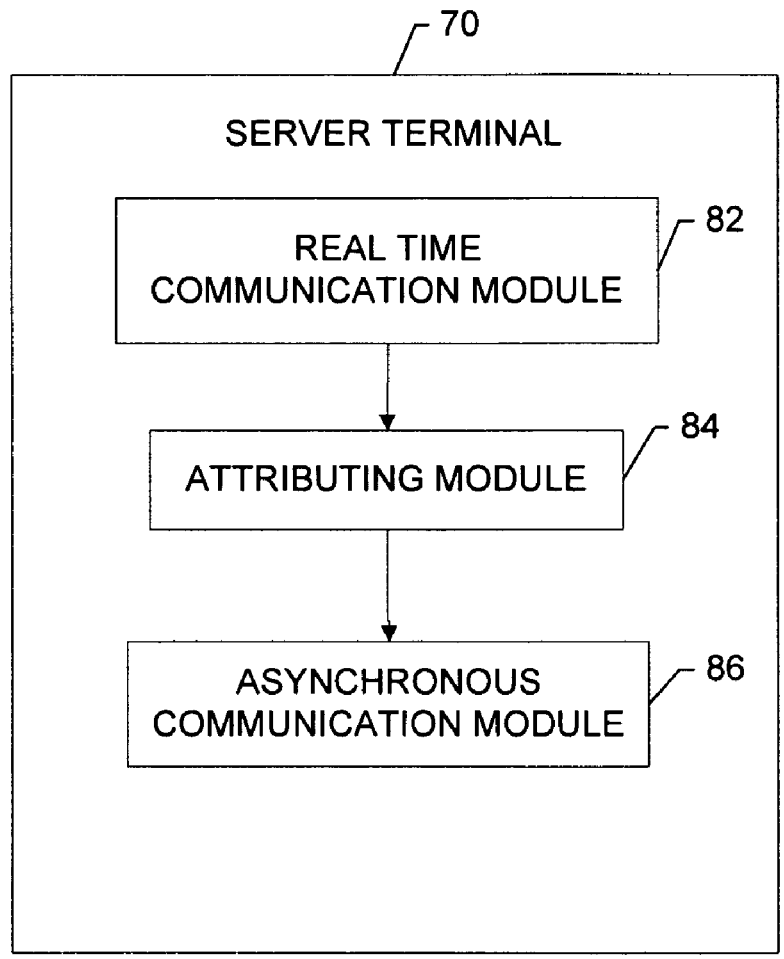
FIG. 4 illustrates a block diagram of elements of a communication portal for providing real time content attributing at a mobile terminal according to an exemplary embodiment of the present invention.

Real time content attributing will now be explained with reference to FIG. 4 in the context of real time chat conversation via the message line described above. However, it should be understood that the message line is simply one exemplary forum for practicing an exemplary embodiment of the present invention and thus, the present invention should not be construed as being limited to such a forum. FIG. 4 is a block diagram showing elements of the communication portal 80. The elements of FIG. 4 may be embodied as instructions stored in a memory of or otherwise accessible by the server terminal 70. However, it should be noted that the elements of FIG. 4, may also be embodied in other devices or means such as software, hardware or combinations of hardware and software and thus, the present invention should not be limited to application on devices such as the mobile terminal 10 of FIG. 1 or the server terminal 70 of FIG. 3. It should also be noted, that while FIG. 4 illustrates one example of a configuration of a system for providing real time content attributing, numerous other configurations may also be used to implement the present invention.

Referring now to FIG. 4, the server terminal 70 may include a real time communication element 82, an attributing element 84, and an asynchronous communication element 86. Each of the real time communication element 82, the attributing element 84, and the asynchronous communication element 86 may be any means or device embodied in hardware, software or a combination of hardware and software that is capable of performing the functions associated with each of the corresponding elements as described below. Although each of the modules may reside on the server terminal 70, in an exemplary embodiment, any active client terminal may access functionality associated with each of the elements.

In an exemplary embodiment, the real time communication element 82 is a module of the message line which accepts text input from any of the group members and displays such text input for viewing by all other group members who are monitoring the message line. Accordingly, when group members communicate via the message line, such communications threads are communicated through the real time communication element 82. The communication threads are displayed during a currently ongoing conversation. However, the communication threads are typically deleted or, in any case, lost after a conversation terminates. Accordingly, for example, if a decision is made during the currently ongoing conversation, which would desirably be made known to group members that are not currently monitoring the communication portal 80 (e.g., the inactive terminal 74), then the group members that are not currently monitoring the communication portal 80 would have to be contacted separately in order to receive notification of the decision. Alternatively, the communication thread could be copied and posted to the message board page, as described above. However, there is no guarantee that the message board page will be consulted when the group members that are not currently monitoring the communication portal 80 access the communication portal 80 at some future time. Thus, the attributing element 84 and the asynchronous communication element 86 may be employed to inform the group members that are not currently monitoring the communication portal 80 of the decision or of other information flowing from the conversation.

The attributing element 84 may be capable of attaching or assigning an attribute to a selected portion of a communication thread. By attaching the attribute to the selected portion, the selected portion may be communicated to either all group members, or at least all group members not currently monitoring the communication portal 80. Accordingly, for example, if a particular communication thread includes a particular text portion that is indicative of a decision which a group member wishes to assign an attribute to, the group member may select the particular text portion and select an attribute to assign to the particular text portion. The selection of the particular text portion may be accomplished by any suitable means, such as by highlighting with a stylus, a mouse, a finger, etc. Additionally, in an exemplary embodiment, once the particular text portion has been selected, an attribute menu may be provided from which a respective attribute may be selected. Examples of attributes may include a decision, a question, an event, meeting coordinates, or a time and place of either a meeting or the next online session, however, any attribute could be assigned.

In response to an attribute being assigned to the particular text portion, the asynchronous communication element 86 may receive the particular text portion and the assigned attribute for dissemination to other group members. In an exemplary embodiment, the asynchronous communication element 86 may deliver the attribute and the particular text portion to group members not currently monitoring the communication portal 80 by an appropriate means. For example, the asynchronous communication element 86 may contact the group members not currently monitoring the communications portal 80 via contact information associated with each of the group members not currently monitoring the communication portal 80 which may be stored in the member list on the server terminal 70. Alternatively, the attribute may specify a means of notification or contacting the group members not currently monitoring the communication portal 80. For example, a decision attribute may specify contacting of group members via an SMS message, while a question attribute may specify that the question be posed to a group member immediately upon accessing to the communication portal 80, when the group member next accesses the communication portal 80.

In an exemplary embodiment, a priority may be associated with each attribute in which the priority determines the means of notification. For example, an event may be a low priority attribute, while a decision may be a high priority attribute. Accordingly, in response to assignment of a low priority attribute, the asynchronous communication element 86 may display the attribute and/or the text portion on a display of each of the group members who were not monitoring the communication portal 80 the next time they access the communication portal 80. In response to assignment of a high priority attribute, the asynchronous communication element 86 may send, for example, an MMS message, an SMS message and/or email to each of the group members who were not monitoring the communication portal 80. In an alternative exemplary embodiment, the attribute may be assigned and a priority may be separately specified, for example, by selecting a priority level from a menu. The asynchronous communication element 86 then selects a notification technique based on the selected priority. According to another alternative, the member list may specify a preferential notification technique, based on either client or portal manager input.

It should also be noted that although the above description has been provided in the context of a group based communication portal, embodiments of the present invention also apply to a one to one communication context such as a group employing IM for communications. In such a group, a group member may have a group list which includes contact information for each other member of the group. During a real time conversation with one individual, the group member may select a portion of the text and assign an attribute as described above. Then, in response to the assigning of the attribute, the portion of the text and the attribute may be communicated to each other member of the group. For example, the group member's mobile terminal may send an SMS message, MMS message or email to each other member of the group based on the contact information from the group list.

Figure 5:
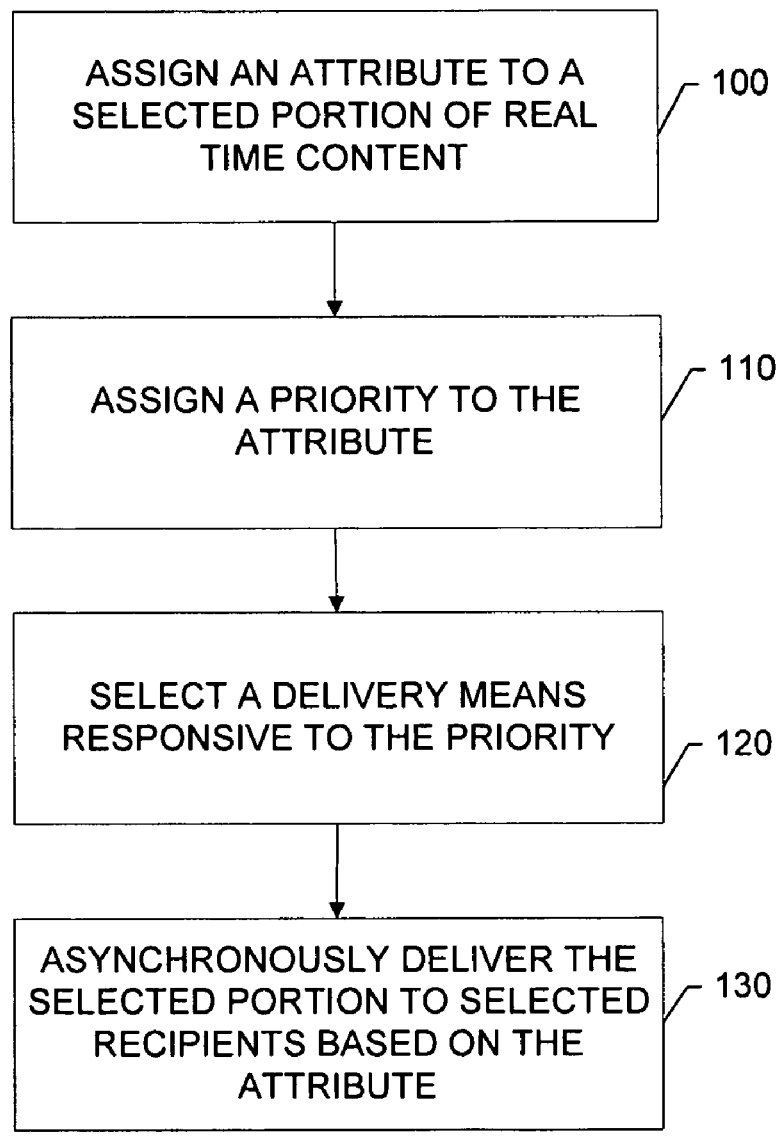
FIG. 5 illustrates a flowchart according to an exemplary method of providing real time content attributing at a mobile terminal.

FIG. 5 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the server terminal and executed by a built-in processor in the server terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing real time content attributing includes assigning an attribute to a selected portion of real time content at operation 100. Operation 100 may include selecting a portion of text from a real time conversation thread. At operation 110, an optional operation of assigning a priority to the attribute may be performed. At operation 120, an optional operation of selecting a delivery means responsive to the priority may be performed. The selected portion is asynchronously delivered to selected recipients based on the attribute at operation 130.

Furthermore, according to exemplary embodiments, the selected group members may be notified by a means determined based on a priority selected. Alternatively, the attribute may correspond to a priority, in which case the selected group members are notified based on the priority corresponding to the attribute, such that the priority determines which notification means is selected. Alternatively, the attribute may correspond directly with a particular notification means. As yet another alternative, the member list may specify a preferential order of notification means.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving an assignment of an attribute to a selected portion of content from an ongoing conversation, the attribute having been assigned to the selected portion of content after the selected portion of content has been communicated as a communication thread among members monitoring the ongoing conversation; and
causing asynchronous delivery of the selected portion to selected recipients based on the attribute via a processor, wherein the selected recipients are selected from a member list identifying at least one member that is not currently monitoring the ongoing conversation.

2. A method according to claim 1, further comprising assigning a priority to the attribute.

3. A method according to claim 2, further comprising selecting a type of delivery responsive to the priority.

4. A method according to claim 1, wherein assigning the attribute comprises assigning an attribute that is indicative of a priority associated with the selected portion.

5. A method according to claim 4, wherein causing asynchronous delivery further comprises causing delivering of the selected portion by a method selected based on the priority.

6. A method according to claim 1, wherein causing asynchronous delivery further comprises causing delivering of the selected portion by a communication method selected responsive to the attribute.

7. A method according to claim 1, wherein causing asynchronous delivery comprises causing sending of a message selected from a group comprising:
an email message;
a short message service (SMS) message; and
a multimedia messaging service (MMS) message.

8. A computer program product comprising at least one non-transitory computer-readable storage medium having computer-readable program code portions stored therein, the computer-readable program code portions comprising:
a first executable portion for receiving an assignment of an attribute to a selected portion of content of an ongoing conversation, the attribute having been assigned to the selected portion of content after the selected portion of content has been communicated as a communication thread among members monitoring the ongoing conversation; and
a second executable portion for causing asynchronous delivery of the selected portion to selected recipients based on the attribute, wherein the selected recipients are selected from a member list identifying at least one member that is not currently monitoring the ongoing conversation.

9. A computer program product according to claim 8, further comprising a third executable portion for assigning a priority to the attribute.

10. A computer program product according to claim 9, further comprising a fourth executable portion for selecting a type of delivery responsive to the priority.

11. A computer program product according to claim 8, wherein the first executable portion comprises instructions for assigning the attribute being indicative of a priority associated with the selected portion.

12. A computer program product according to claim 11, wherein the second executable portion comprises instructions for delivering the selected portion by a method selected based on the priority.

13. A computer program product according to claim 8, wherein the second executable portion comprises instructions for delivering the selected portion by a communication method selected responsive to the attribute.

14. A computer program product according to claim 8, wherein the second executable portion comprises instructions for sending a message selected from a group comprising: an email message; a short message service (SMS) message; and a multimedia messaging service (MMS) message.

15. An apparatus comprising a processor and a memory storing executable instructions that in response to execution by the processor cause the apparatus to at least perform the following:
  receiving an assignment of an attribute to a selected portion of content from an ongoing conversation, the attribute having been assigned to the selected portion of content after the selected portion of content has been communicated as a communication thread among members monitoring the ongoing conversation; and
  causing asynchronous delivery of the selected portion to selected recipients based on the attribute, wherein the selected recipients are selected from a member list identifying at least one member that is not currently monitoring the ongoing conversation.

16. An apparatus according to claim 15, wherein the attribute is assigned by one of the apparatus and a client device in communication with the apparatus.

17. An apparatus according to claim 15, wherein the attribute is associated with a priority.

18. An apparatus according to claim 17, wherein the instructions further configure the apparatus to select a type of delivery responsive to the priority.

19. An apparatus according to claim 17, wherein the priority is assigned by one of the apparatus and a client device in communication with the apparatus.

20. An apparatus according to claim 15, wherein the instructions further configure the apparatus to deliver the selected portion in accordance with the attribute.

21. An apparatus according to claim 20, wherein the instructions further configure the apparatus to deliver the selected portion as a communication method selected from a group comprising:
  an email message;
  a short message service (SMS) message; and
  a multimedia messaging service (MMS) message.

22. An apparatus according to claim 15, wherein the instructions further configure the apparatus to deliver the selected portion in accordance with a preference indicated in a member list.

23. An apparatus according to claim 15, wherein the content is text content shared over a communication portal hosted at the mobile terminal and accessible to at least one client terminal.

24. A system for providing content attributing during an ongoing conversation, the system comprising a mobile terminal and a client device in communication via a communication portal, wherein the mobile terminal comprises a processor and a memory storing executable instructions that in response to execution by the processor cause the mobile terminal to at least perform the following:
  receiving an assignment of an attribute to a selected portion of content from an ongoing conversation, the attribute having been assigned to the selected portion of content after the selected portion of content has been communicated as a communication thread among members monitoring the ongoing conversation; and
  asynchronously delivering the selected portion to selected recipients based on the attribute, wherein the selected recipients are selected from a member list identifying at least one member that is not currently monitoring the ongoing conversation.

25. A system according to claim 24, wherein the attribute is assigned by one of the mobile terminal and the client device in communication with the mobile terminal.

26. A system according to claim 24, wherein the attribute is associated with a priority.

27. A system according to claim 26, wherein the mobile terminal is further configured to select a type of delivery responsive to the priority.

28. A system according to claim 26, wherein the priority is assigned by one of the mobile terminal and the client device in communication with the mobile terminal.

29. A system according to claim 24, wherein the mobile terminal is further configured to deliver the selected portion by a communication method selected responsive to the attribute.

30. A system according to claim 29, wherein the communication method is selected from a group comprising:
  an email message;
  a short message service (SMS) message; and
  a multimedia messaging service (MMS) message.

31. A system according to claim 24, wherein the content is text content shared over a communication portal hosted at the mobile terminal and accessible to the client device.

32. A method according to claim 1, wherein receiving the assignment of the attribute comprises receiving the assignment of the attribute responsive to selection of the attribute from an attribute menu.

33. A computer program product according to claim 8, wherein the first executable portion comprises instructions for assigning the attribute responsive to selection of the attribute from an attribute menu.

34. An apparatus according to claim 15, wherein the instructions further configure the apparatus to receive the assignment of the attribute responsive to selection of the attribute from an attribute menu.

* * * * *